United States Patent

Sasaki

(10) Patent No.: US 9,616,937 B2
(45) Date of Patent: Apr. 11, 2017

(54) VEHICLE BODY STRUCTURE

(71) Applicant: TOYOTA JIDOSHA KABUSHIKI KAISHA, Toyota-shi, Aichi-ken (JP)

(72) Inventor: Takashi Sasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/971,209

(22) Filed: Dec. 16, 2015

(65) Prior Publication Data

US 2016/0185394 A1 Jun. 30, 2016

(30) Foreign Application Priority Data

Dec. 26, 2014 (JP) .................................. 2014-265785

(51) Int. Cl.
*B62D 29/00* (2006.01)
*B62D 25/08* (2006.01)
*B62D 27/02* (2006.01)

(52) U.S. Cl.
CPC ......... *B62D 25/088* (2013.01); *B62D 27/023* (2013.01); *B62D 29/00* (2013.01); *B62D 29/008* (2013.01)

(58) Field of Classification Search
CPC .... B62D 27/023; B62D 25/088; B62D 29/00; B62D 29/008
USPC ........................................................ 296/191
See application file for complete search history.

(56) References Cited

U.S. PATENT DOCUMENTS

| | | | | |
|---|---|---|---|---|
| 5,456,517 A | * | 10/1995 | Kalian | B60G 15/068 164/47 |
| 6,354,627 B1 | * | 3/2002 | Kasuga | B62D 21/00 280/781 |
| 9,283,995 B2 | * | 3/2016 | Hisazumi | B62D 25/081 |
| 2009/0188100 A1 | * | 7/2009 | Durney | B32B 1/00 29/469 |
| 2015/0069777 A1 | * | 3/2015 | An | B62D 27/023 296/29 |
| 2015/0375795 A1 | * | 12/2015 | Freis | B21J 15/36 296/191 |

FOREIGN PATENT DOCUMENTS

| | | |
|---|---|---|
| DE | 19939978 A1 | 3/2001 |
| EP | 1880792 A2 | 1/2008 |
| EP | 2128004 A1 | 12/2009 |
| JP | 2000272541 A | 10/2000 |
| JP | 2010-018087 A | 1/2010 |
| JP | 2010-111200 A | 5/2010 |
| JP | 2010-194583 A | 9/2010 |

* cited by examiner

*Primary Examiner* — Pinel Romain
(74) *Attorney, Agent, or Firm* — Oliff PLC

(57) ABSTRACT

In a vehicle rear structure that is one example of a vehicle body structure, a rear suspension tower that is made of die-cast aluminum and a wheel housing outer that is made of a metal material having a higher fatigue strength than the die-cast aluminum of the rear suspension tower, are joined together via an extension panel that is made of a metal material having a higher fatigue strength than the die-cast aluminum of the rear suspension tower. Further, a step portion is formed between an inner peripheral portion and an outer peripheral portion of the extension panel to form a deformable portion.

16 Claims, 9 Drawing Sheets

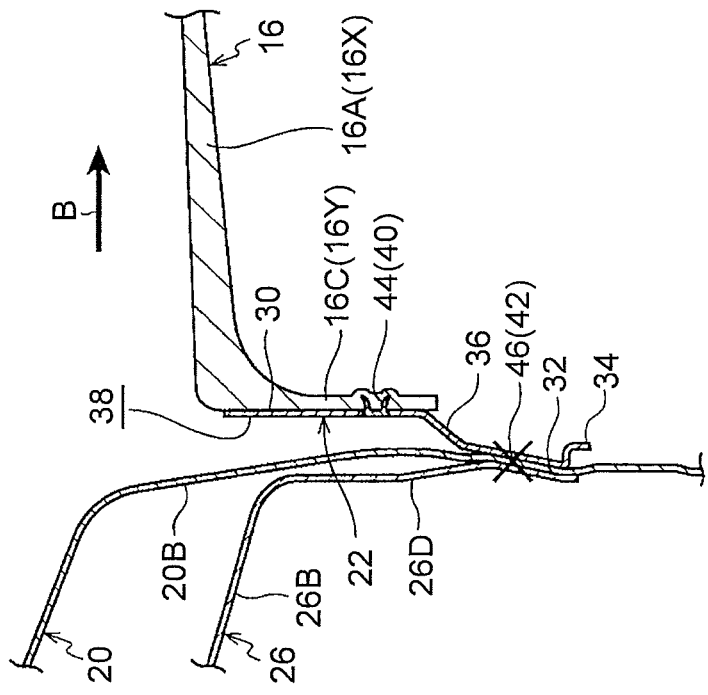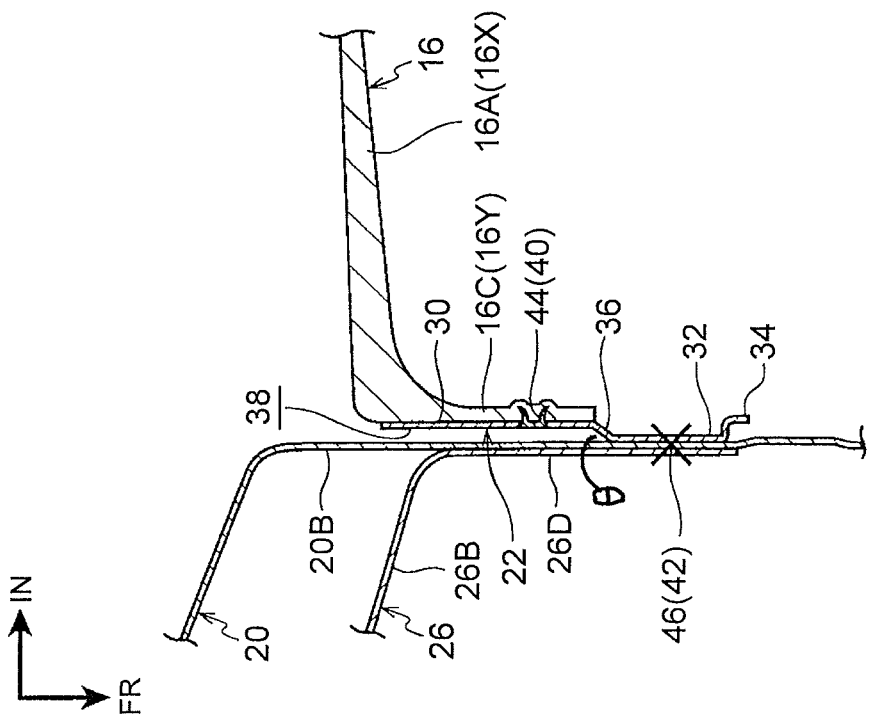

ns of vehicle body structure and related patent background material follow.

VEHICLE BODY STRUCTURE

INCORPORATION BY REFERENCE

The disclosure of Japanese Patent Application No. 2014-265785 filed on Dec. 26, 2014 including the specification, drawings and abstract is incorporated herein by reference in its entirety.

BACKGROUND

1. Field of the Invention

The disclosed embodiments relate to a vehicle body structure.

2. Description of Related Art

Japanese Patent Application Publication No. 2010-18087 (JP 2010-18087 A) describes a rear vehicle body portion of a vehicle. In summary, a vehicle body side wall of a vehicle body rear portion is formed by a side panel inner that forms a cabin inside wall surface, and a side panel outer that forms a vehicle body outside wall surface. Also, a lower portion of the side panel inner is a wheel arch portion that curves outward relative to a vehicle width direction. Moreover, in a vehicle side view, a reinforcement that extends in a vehicle up-down direction is arranged in the center portion of the wheel arch portion, and a closed section (a chamber) is formed by this reinforcement and a vertical wall portion of the side panel inner and the wheel arch portion. Also, a height direction intermediate portion of the reinforcement includes a reinforcing member formed in a hat shape that is open outward relative to the vehicle width direction in a vehicle back view, and is provided as a bulkhead of the reinforcement.

Meanwhile, a suspension damper support member having a vertical sectional shape that is an inverted L-shape in a vehicle back view extends between a cabin outside surface of a rear wheel housing and a cabin inside surface of the side panel inner. Further, a suspension housing gusset extends inclined between an upper surface portion of the suspension damper support member and a vertical wall portion of a side panel inner. A top portion on a non-open side of the reinforcement is spot welded to a weld flange portion formed on an upper end portion of the suspension housing gusset, with the vertical wall portion of the side panel inner interposed between the two, thus forming a three-ply structure.

All of the three members in the related art described above are steel sheet, but recently consideration is being given to rear suspension towers made of die-cast aluminum in order to reduce vehicle weight and the like.

However, when a wheel housing made of steel sheet and a rear suspension tower made of die-cast aluminum are directly joined together, durability may decrease (the life of the rear suspension tower may be shortened). That is, a pushing-up force toward a vehicle upper side from an absorber acts on the rear suspension tower when a vehicle is traveling. As a result, a pulling force toward the vehicle width direction inside acts on the rear suspension tower, and the rear suspension tower deforms as a result of this pulling force. Aluminum alloy material has a lower fatigue strength than steel material, so if metal fatigue accumulates in the rear suspension tower due to this deformation repeatedly occurring in the rear suspension tower, it may lead to earlier failure.

SUMMARY

Preferred embodiments thus provide a vehicle body structure capable of improving the durability of a first vehicle body panel with respect to repeated input of forces when a vehicle is traveling, in a structure in which the first vehicle body panel that is made of die-cast aluminum is joined to a second vehicle body panel that is made of a metal material having a higher fatigue strength than the die-cast aluminum of the first vehicle body panel.

A vehicle body structure includes a first vehicle body panel that is made of die-cast aluminum; a second vehicle body panel that is made of a metal material having a higher fatigue strength than the die-cast aluminum of the first vehicle body panel; and a third vehicle body panel that is made of a metal material having a higher fatigue strength than the die-cast aluminum of the first vehicle body panel, the third vehicle body panel being joined to the first vehicle body panel by a first joint, the third vehicle body panel being interposed between the first vehicle body panel and the second vehicle body panel and the third vehicle body panel being joined to the second vehicle body panel by a second joint; wherein the third vehicle body panel includes a deformable portion provided between the first joint and the second joint, the deformable portion configured to elastically deform, when a load in a direction away from the second vehicle body panel acts on the first vehicle body panel, in the direction in which the load acts on the first vehicle body panel.

The first vehicle body panel is made of die-cast aluminum, and the second vehicle body panel and the third vehicle body panel are made of a metal material having a higher fatigue strength than the die-cast aluminum of the first vehicle body panel. Moreover, the third vehicle body panel is interposed between the first vehicle body panel and the second vehicle body panel, the first vehicle body panel is joined to the third vehicle body panel at the first joint, and the second vehicle body panel is joined to the third vehicle body panel at the second joint.

Here, in the embodiments, the deformable portion is provided between the first joint and the second joint of the third vehicle body panel. Therefore, when a pulling force in a direction away from the second vehicle body panel acts on the first vehicle body panel when the vehicle is traveling, the deformable portion will elastically deform in the direction in which the load acts on the first vehicle body panel. As a result, deformation of the first vehicle body panel that is made of die-cast aluminum is suppressed by the amount that the deformable portion elastically defaults. That is, even if the first vehicle body panel is made of aluminum alloy material that has low fatigue strength, the deformable portion of the third vehicle body panel will elastically deform instead of the first vehicle body panel, so the load on the first vehicle body panel is reduced, as a result, deformation of the first vehicle body panel is able to be suppressed.

A vehicle body structure may be such that the first vehicle body panel includes a main body wall portion and a joining flange that is bent from an end portion of the main body wall portion; and the flange is joined to the third vehicle body panel by the first joint.

When a load in a direction away from the second vehicle body panel acts on the main body wall portion of the first vehicle body panel, the joining flange is also pulled in the direction in which the load acts on the first vehicle body panel by the load. Therefore, the third vehicle body panel that is joined to the flange at the first joint is pulled in the direction in which the load acts on the first vehicle body panel. Because the third vehicle body panel is joined to the second vehicle body panel at the second joint, when this load is applied, the easily deformable of the third vehicle body panel elastically deforms in the direction in which the load acts on the first vehicle body panel. As a result, input of force to the flange is reduced, so deformation of the flange is suppressed. That is, when the first vehicle body panel is a structure that includes the main body wall portion and the flange that is bent from the main body wall portion, and is the first vehicle body panel is joined to the third vehicle body panel at the flange, the flange tends to easily deform so as to open with respect to the main body wall portion, but this opening deformation is able to be inhibited.

A vehicle body structure may be such that the deformable portion is a step portion having an inclined wall that is inclined with respect to the second vehicle body panel.

The deformable portion is a step portion having an inclined wall that is inclined with respect to the second vehicle body panel, so performance related to absorbing deformation of the first vehicle body panel is able to be adjusted by adjusting the height (length) and inclination angle of the step portion.

A vehicle body structure may be such that an inclination angle of the inclined wall of the step portion with respect to the second vehicle body panel is set to an angle of greater than 0° and equal to or less than 45°.

The inclination angle of the inclined wall of the step portion with respect to the second vehicle body panel is set to an angle of greater than 0° and equal to or less than 45°, so the inclination angle of the inclined wall of the step portion may be said to be small. Therefore, the amount of elastic deformation of the third vehicle body panel is able to be increased compared to when the inclination angle of the inclined wall of the step portion is large.

A vehicle body structure may be such that the third vehicle body panel includes a first portion having an area that is positioned adjacent to the flange and joined to the flange at the first joint, and a second portion having an area and being positioned adjacent to the second vehicle body portion and joined to the second vehicle body panel by the second joint; and the deformable portion is formed in a boundary area that extends between the first portion and the second portion.

The flange of the first vehicle body panel is joined to the first portion of the third vehicle body panel at the first joint. Also, the second vehicle body panel is joined to the second portion of the third vehicle body panel at the second joint. Also, in the embodiment, the deformable portion is provided in the boundary area that extends between the first portion and the second portion of the third vehicle body panel, so the functions (such as strength and rigidity) of the "joining area" required by the first portion and the second portion are not lost by the deformable portion.

A vehicle body structure may be such that the main body wall portion has an inverted U-shape in which a vehicle lower side is open in a side view viewed from a vehicle width direction outside; the flange is formed in an inverted U-shape on an end portion outer periphery on the vehicle width direction outside of the main body wall portion in the side view viewed from the vehicle width direction outside; the first portion of the third vehicle body panel is formed in an inverted U-shape following the flange, and the second portion of the third vehicle body panel is formed in an inverted U-shape to an outside of the first portion; and the deformable portion is formed along an entire periphery of the boundary portion between the first portion and the second portion.

The flange that is formed in an inverted U-shape is joined to the first portion of the third vehicle body panel, and the second portion that is formed to the outside of the first portion of the third vehicle body panel is joined to the second vehicle body panel. Also, the deformable portion is formed along the entire periphery of the boundary area that extends between the first portion and the second portion, so the deformable portion of the third vehicle body panel is able to be elastically deformed using all of the pulling force transmitted from the main body portion of the first vehicle body panel to the flange.

A vehicle body structure may be such that the first joint is a mechanical joint; and the second joint is a metallurgical joint.

The first vehicle body panel that is made of die-cast aluminum and the third vehicle body panel that is made of a metal material having a higher fatigue strength than the die-cast aluminum of the first vehicle body panel are joined by a mechanical joint. On the other hand, the third vehicle body panel and the second vehicle body panel that is made of a metal material having a higher fatigue strength than the die-cast aluminum of the first vehicle body panel are joined by a metallurgical joint. In this way, a joint that is more preferable for the type and combination of vehicle body panels is able to be employed when joining two vehicle body panels together.

A vehicle body structure according to another embodiment includes a first vehicle body panel that is made of die-cast aluminum; a second vehicle body panel that is made of a metal material having a higher fatigue strength than the die-cast aluminum of the first vehicle body panel; and a third vehicle body panel that is made of a metal material having a higher fatigue strength than the die-cast aluminum of the first vehicle body panel, the third vehicle body panel being joined to the first vehicle body panel by a first joint, the third vehicle body panel being interposed between the first vehicle body panel and the second vehicle body panel and the third vehicle body panel being joined to the second vehicle body panel by a second joint; wherein the second vehicle body panel includes a deformable portion provided on a portion of the second vehicle body panel where the second joint is located, the deformable portion being configured to elastically deform, when a load in a direction away from the second vehicle body panel acts on the first vehicle body panel, in the direction in which the load acts on the first vehicle body panel.

The first vehicle body panel is made of die-cast aluminum, and the second vehicle body panel and the third vehicle body panel are made of a metal material having a higher fatigue strength than the die-cast aluminum of the first vehicle body panel. Further, the third vehicle body panel is interposed between the first vehicle body panel and the second vehicle body panel, the first vehicle body panel is joined to the third vehicle body panel at the first joint, and the second vehicle body panel is joined to the third vehicle body panel at the second joint.

Here, in the embodiment, the deformable portion is provided on a portion of the second vehicle body panel where the second joint is located. Therefore, when a load in a direction away from the second vehicle body panel acts on the first vehicle body panel when the vehicle is traveling, the deformable portion will elastically deform in the direction in which the load acts on the first vehicle body panel. As a result, deformation of the first vehicle body panel that is made of die-cast aluminum is suppressed by the amount that the deformable portion elastically deforms. That is, even if the first vehicle body panel is made of aluminum alloy material that has a low fatigue strength, the deformable portion of the third vehicle body panel located on the second vehicle body panel will elastically deform instead of the first vehicle body panel, so the load on the first vehicle body panel is reduced, as a result, deformation of the first vehicle body panel is able to be suppressed.

A vehicle body structure may be such that the first vehicle body panel is a rear suspension tower; the second vehicle body panel is a wheel housing outer; and the third vehicle body panel is an extension panel that is formed separately from the rear suspension tower and separately from the wheel housing outer.

The extension panel that is separate from the rear suspension tower is interposed between the die-cast aluminum rear suspension tower and the wheel housing outer. Also, the rear suspension tower and the extension panel are joined at the first joint, and the wheel out outer and the rear suspension tower are joined at the second joint. Accordingly, when a pushing-up force toward the vehicle upper side acts on the rear suspension tower when the vehicle is traveling, a pulling force toward the vehicle width direction inside acts as a component force on the rear suspension tower. Therefore, the rear suspension tower is pulled in a direction away from the wheel housing outer, but the deformable portion of the extension panel elastically deforms, so the load applied to the rear suspension tower is reduced. As a result, deformation of the rear suspension tower is suppressed.

As described above, the vehicle structure has a beneficial effect in which, in a structure in which the first vehicle body panel that is made of die-cast aluminum and the second vehicle body panel that is made of a metal material having a higher fatigue strength than the die-cast aluminum of the first vehicle body panel are joined together, the durability of the first vehicle body panel with respect to repeated input of force when the vehicle is traveling is able to be improved.

The vehicle structure may have a beneficial effect in which when the first vehicle body panel is joined to the third vehicle body panel at the joining flange, deformation of the flange of the first vehicle body panel is effectively suppressed, which enables the durability of the first vehicle body panel to be improved.

The vehicle structure may have a beneficial effect in which performance related to absorbing deformation of the first vehicle body panel is able to be optimized.

The vehicle structure may have a beneficial effect in that deformation of the first vehicle body panel is able to be more effectively suppressed.

The vehicle structure may have a beneficial effect in which a function of absorbing deformation of the first vehicle body panel is able to be given to the third vehicle body panel, while maintaining a good joining state between the third vehicle body panel and the first vehicle body panel and the second vehicle body panel.

The vehicle structure may have a beneficial effect in which deformation of the rear suspension tower is able to be effectively suppressed by efficiently elastically deforming the deformable portion of the extension panel.

The vehicle structure may have a beneficial effect in which the joining of the first vehicle body panel and the third vehicle body panel and the joining of the second vehicle body panel and the third vehicle body panel are able to be optimized.

The vehicle structure may have a beneficial effect in which, in a structure in which the rear suspension tower that is made of die-cast aluminum and the wheel housing outer that is made of a metal material having a higher fatigue strength than the die-cast aluminum of the rear suspension tower are joined together, the durability of the rear suspension tower with respect to repeated input of force when the vehicle is traveling is able to be improved.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7A is an enlarged top sectional view of the portion indicated by arrow X in FIG. 5;

FIG. 7B is a top sectional view of a deformation mode when a pushing-up force toward the vehicle upper side acts on a rear suspension tower from the state shown in FIG. 7A;

DETAILED DESCRIPTION OF EMBODIMENTS

First Example Embodiment

Figure 1:
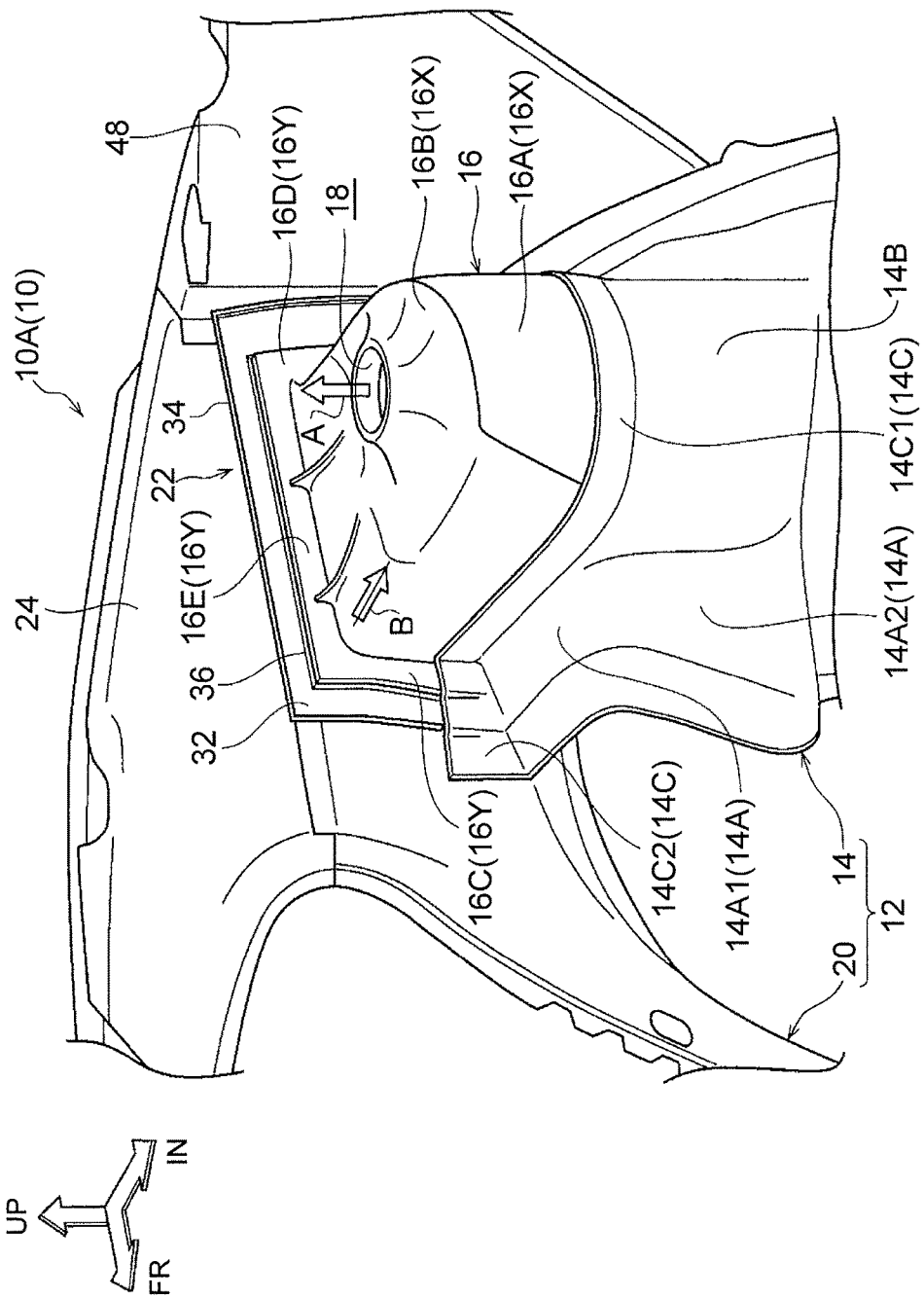
FIG. 1 is a perspective view of a vehicle rear structure according to a first example embodiment, viewed from a vehicle width direction inside.

A vehicle rear structure according to a first example embodiment will now be described with reference to FIGS. 1 to 8B. In the drawings, arrow FR indicates a vehicle front side, arrow UP indicates a vehicle upper side, and arrow IN indicates a vehicle width direction inside.

<Overall Structure>

Figure 2:
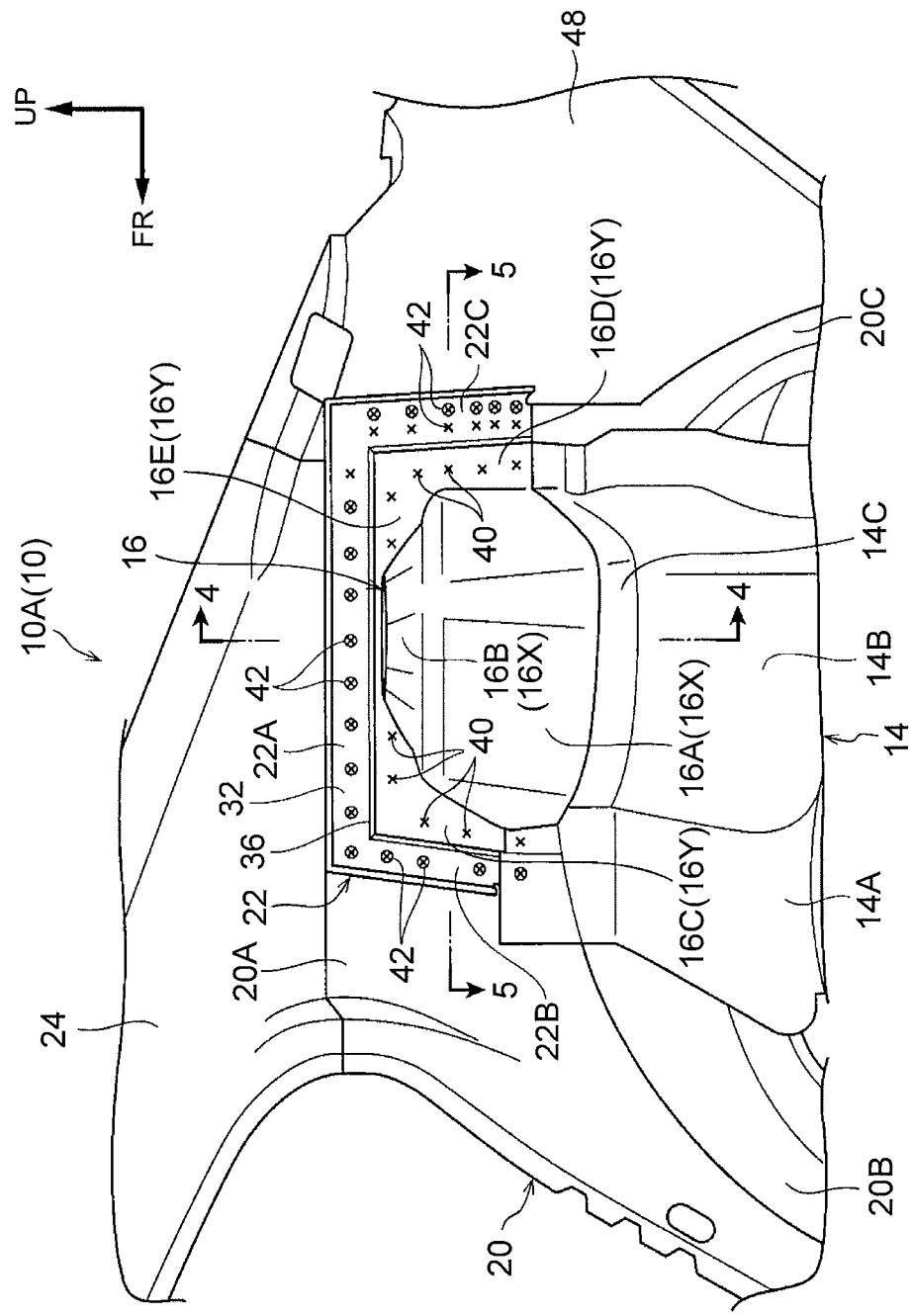
FIG. 2 is a side view of the vehicle rear structure shown in FIG. 1 viewed from the vehicle width direction inside.
Figure 3:
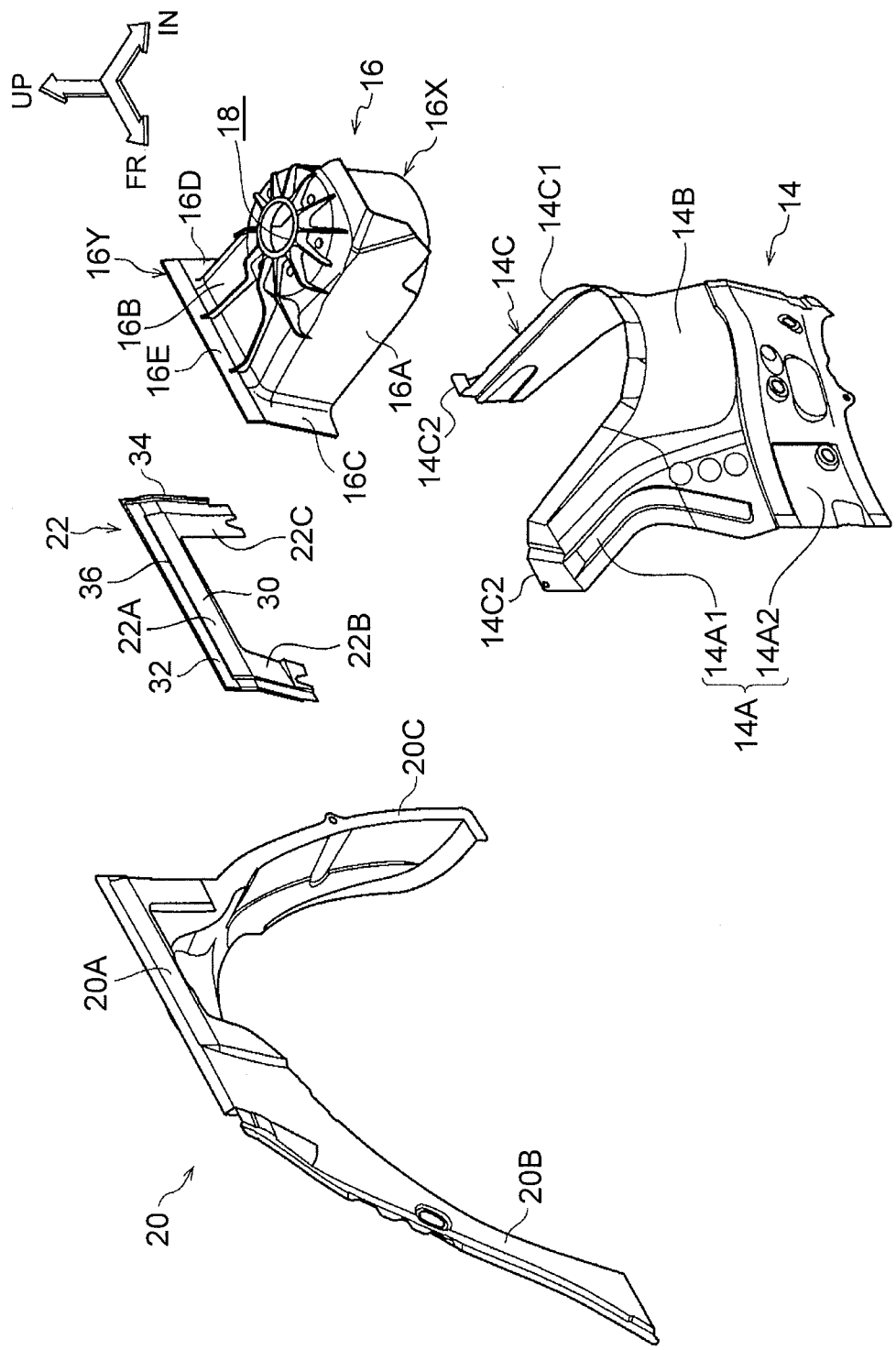
FIG. 3 is an exploded perspective view of the main panels that form the vehicle rear structure shown in FIG. 1.

As shown in FIGS. 1 to 3, a wheel housing inner 14 that forms an inner panel of a rear wheel housing 12 and which has an upper end portion that is open and generally U-shaped, a rear suspension tower 16 that is joined fitted around the upper end portion of the wheel housing inner 14, a wheel housing outer 20 that is arranged on a vehicle width direction outside of the wheel housing inner 14 and forms an outer panel of the rear wheel housing 12, and an extension panel 22 that is interposed between the rear suspension tower 16 and the wheel housing outer 20, are all provided on a rear portion 10A of a vehicle 10. The rear suspension tower 16 is an example of a first vehicle body panel, the wheel housing outer 20 is an example of a second vehicle body panel and the extension panel 22 is an example of a third vehicle body panel. The description below will focus around these members.

<Wheel Housing Inner 14>

The wheel housing inner 14 is made of steel sheet. Also, the wheel housing inner 14 includes a wheel housing inner main body 14A formed in a vertically inverted L-shape when viewed from the vehicle front side, a supporting portion 14B that is U-shaped in a plan view and that is integrally formed on an upper portion side of the wheel housing inner main body 14A, and an upper end flange portion 14C that is integrally formed on a vehicle width direction outside end edge of the wheel housing inner main body 14A as well as on an upper end outer periphery of the supporting portion 14B.

The wheel housing inner main body 14A includes a lateral wall portion 14A1 that extends in a vehicle longitudinal (front-rear) direction and in a vehicle width direction, and a vertical wall portion 14A2 that curves downward toward the vehicle lower side from a vehicle width direction inside end portion of this lateral wall portion 14A1. Also, the supporting portion 14B is formed in a generally semicylindrical shape that bulges out toward the vehicle width direction inside. Further, the upper end flange portion 14C includes a first flange portion 14C1 formed along an upper end outer periphery of the supporting portion 14B, and a second flange portion 14C2 that is provided to stand upright from a vehicle width direction outside end edge of the lateral wall portion 14A1 of the wheel housing inner main body 14A. The first flange portion 14C1 and the second flange portion 14C2 are integrally formed in a continuous manner. A lower portion of the vertical wall portion 14A2 of the wheel housing inner main body 14A described above is joined to a vehicle frame member (such as a rear side member), not shown, that is arranged along substantially the vehicle front-rear direction.

<Rear Suspension Tower 16>

The rear suspension tower 16 is made of die-cast aluminum.

Also, the rear suspension tower 16 includes a main body wall portion 16X formed in an inverted U-shape with a vehicle lower side open in a side view viewed from the vehicle width direction outside. More specifically, the main body wall portion 16X includes a vertical wall portion 16A that is arranged in a U-shape with a vehicle width direction outside open in a plan view, and that extends in the vehicle up-down direction, and an upper surface portion 16B that closes off the upper portion of this vertical wall portion 16A. A region on the vehicle width direction inside of the upper surface portion 16B protrudes out toward the vehicle upper side in a generally circular shape, and an opening 18 is formed passing through in the vehicle up-down direction, in the center portion of this region. An upper end portion of an absorber (e.g., a shock absorber) of the rear suspension, not shown, that is arranged inside the rear suspension tower 16 is attached to the lower side of the opening 18 in the upper surface portion 16B.

Also, a joining flange 16Y that has an inverted U-shape in a side view viewed from the vehicle width direction outside is integrally formed on a vehicle width direction outside end portion of the main body wall portion 16X of the rear suspension tower 16. More specifically, the joining flange 16Y includes a front bent portion 16C that is arranged on the vehicle front side and extends in the vehicle up-down direction, a rear bent portion 16D that is arranged on the vehicle rear side and extends in the vehicle up-down direction, and an upper bent portion 16E that is arranged on the vehicle upper side and extends in the vehicle front-rear direction, and connects the front bent portion 16C to the rear bent portion 16D in the vehicle front-rear direction.

<Wheel Housing Outer 20>

As shown in FIGS. 1 to 5, the wheel housing outer 20 formed in a general semicircular shape in a side view is arranged on the vehicle width direction outside of the wheel housing inner 14 and the rear suspension tower 16. The wheel housing outer 20 is also made of steel sheet, just like the wheel housing inner 14. Also, the wheel housing outer 20 includes a center portion 20A that is arranged on the vehicle width direction outside of the rear suspension tower 16, and a front portion 20B and a rear portion 20C that extend in arc shapes toward the front and rear, respectively in the vehicle front-rear direction from this center portion 20A. A roof side inner 24 that extends in substantially the vehicle front-rear direction and in substantially the vehicle up-down direction is arranged on a vehicle upper side of the wheel housing outer 20.

Figure 4:
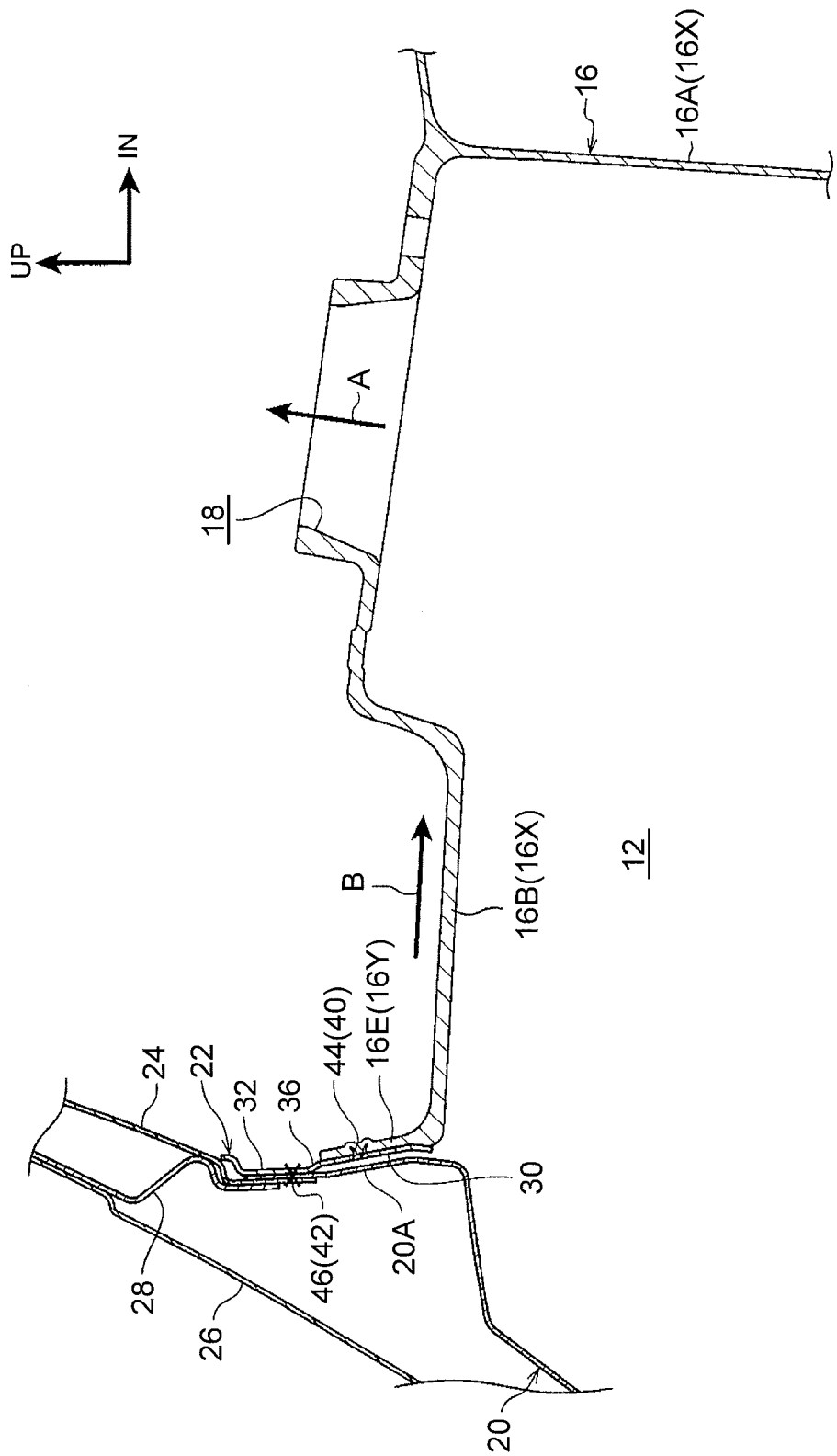
FIG. 4 is a sectional view (i.e., a longitudinal sectional view) taken along line 4-4 in FIG. 2, of the vehicle rear structure shown in FIG. 2 cut along line 4-4.
Figure 5:
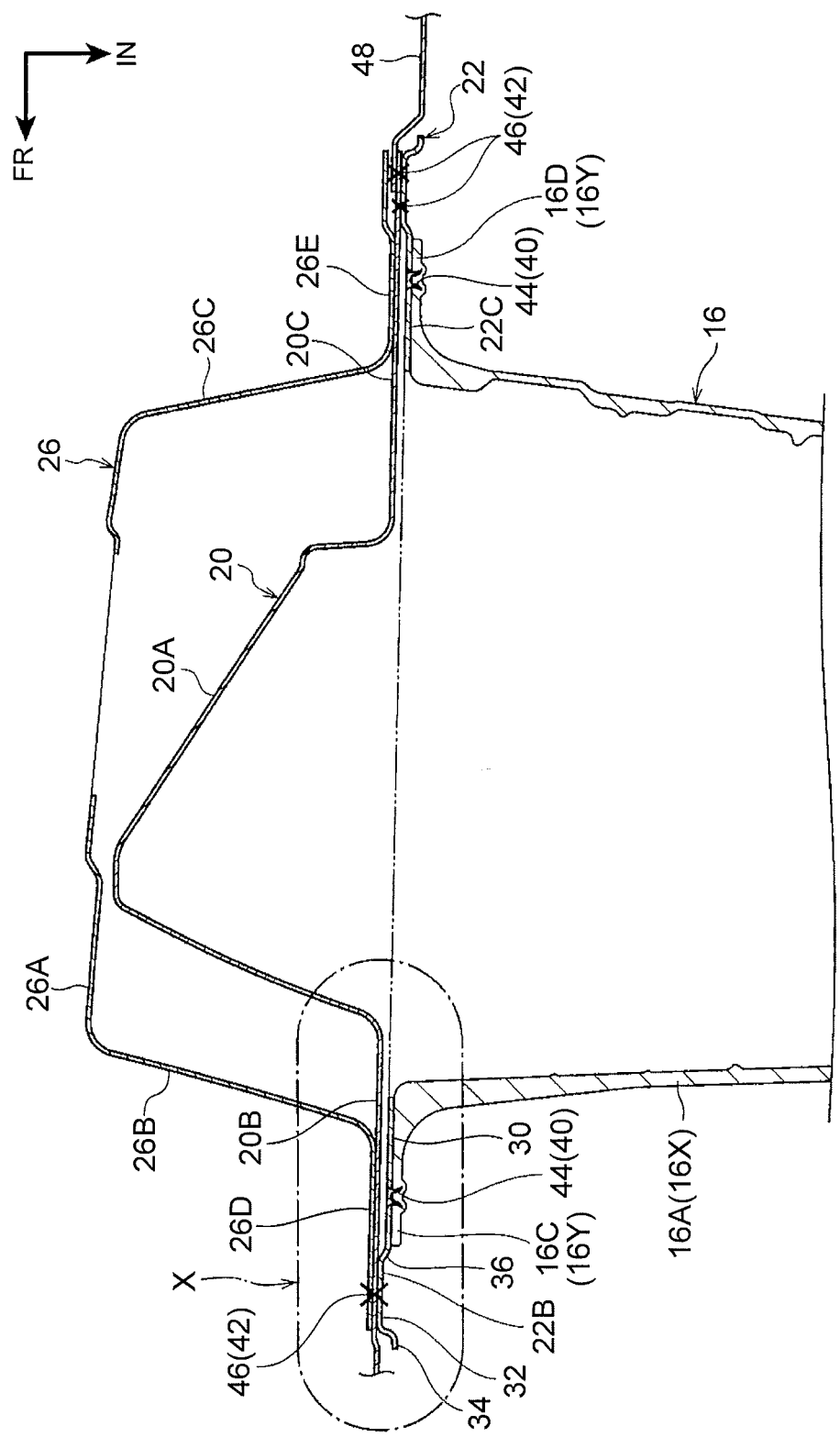
FIG. 5 is a sectional view (i.e., a top sectional view) taken along in 5-5 in FIG. 2, of the vehicle rear structure shown in FIG. 2 cut along line 5-5.
Figure 6:
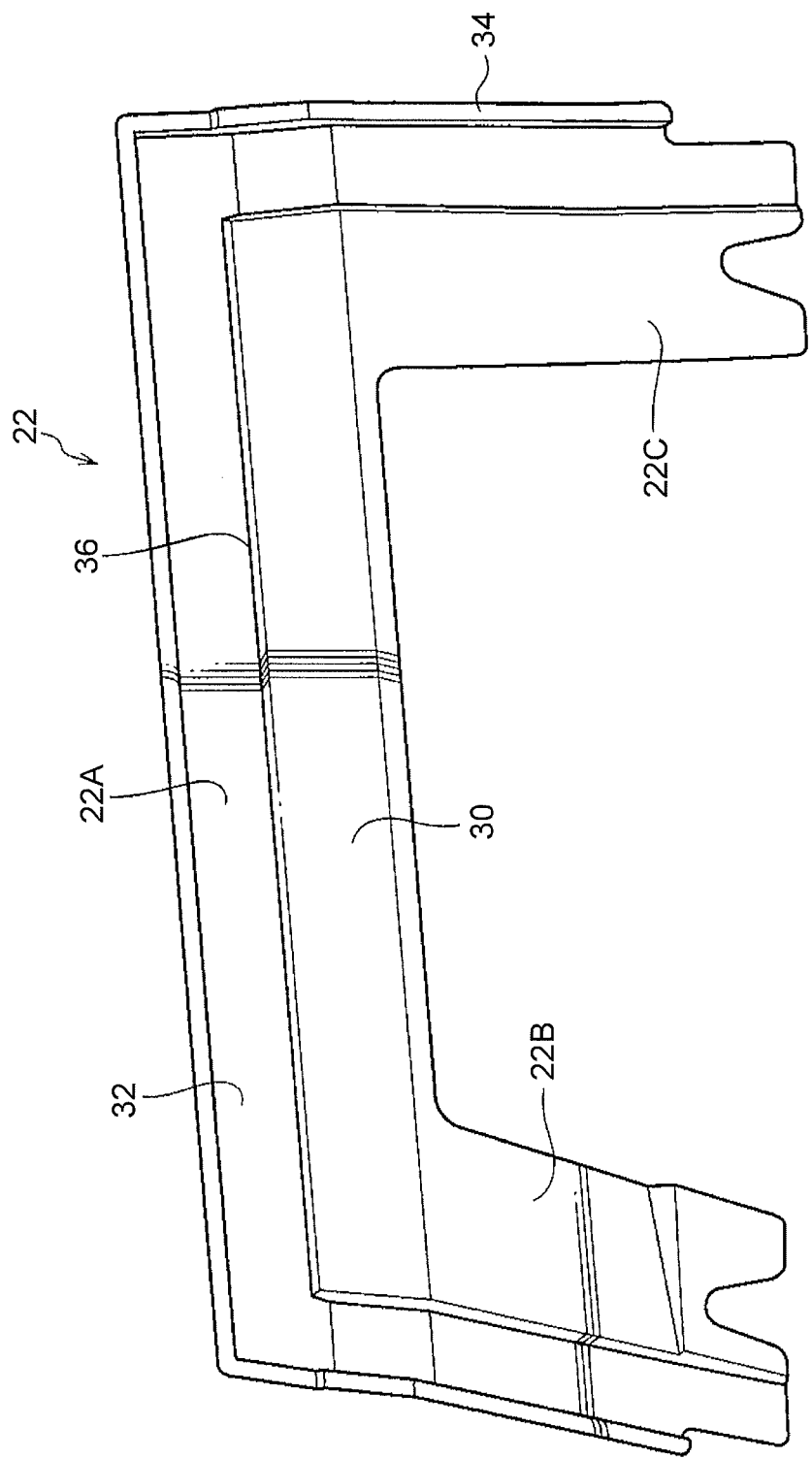
FIG. 6 is an enlarged perspective view of an extension panel shown in FIG. 3, shown separately.

Also, as shown in FIGS. 4 and 5, a roof side outer 26 that has a generally hat-shaped top sectional shape is arranged on the vehicle width direction outside of the center portion 20A of the wheel housing outer 20 and the roof side inner 24. More specifically, as shown in FIG. 5, the roof side outer 26 includes an outside wall portion 26A arranged along substantially the vehicle up-down direction and in substantially the vehicle front-rear direction, a front wall portion 26B that extends forward at an angle toward the vehicle width direction inside from a vehicle front-rear direction front end portion of the outside wall portion 26A, and a rear wall portion 26C that extends downward at an angle toward the vehicle width direction inside from a vehicle front-rear direction rear end portion of the outside wall portion 26A. Moreover, the roof side outer 26 also includes a front flange portion 26D that is bent toward the vehicle front side from a vehicle width direction inside end portion of the front wall portion 26B, and a rear flange portion 26E that is bent toward the vehicle rear side from a vehicle width direction inside end portion of the rear wall portion 26C. Also, as shown in FIG. 4, the roof side outer 26 is arranged at an angle so as to be a rising slope toward the vehicle width direction inside. A roof side rail outer 28 is arranged between the roof side outer 26 and the roof side inner 24. The roof side outer 26 having this structure is also referred to as a roof side outer reinforcement, and forms a closed sectional structure (a chamber) with the roof side inner 24 described above, and functions as a vehicle outside frame member.

<Extension Panel 22>

The extension panel 22 is interposed between the bent portions 16C, 16D, and 16E of the rear suspension tower 16 and the center portion 20A of the wheel housing outer 20. The extension panel 22 is formed by press-forming a steel sheet. The extension panel 22 is formed by a plate that is thicker than the plate thickness of the wheel housing outer 20. In this example embodiment, as an example, the extension panel 22 is formed by a plate that is approximately 0.3 to 0.5 mm thicker than the thickness of the wheel housing outer 20, but the extension panel 22 is not limited to this thickness and may be changed as appropriate.

As shown in FIGS. 1 to 6 (particularly FIG. 6), the extension panel 22 is formed in a general U-shape that is vertically inverted in a side view viewed from the vehicle width direction outside. Structurally, the extension panel 22 includes a first extended portion 22A that extends along the vehicle front-rear direction, a second extended portion 22B that extends toward the vehicle lower side from a front end portion of the first extended portion 22A, and a third extended portion 22C that extends toward the vehicle lower side from a rear end portion of the first extended portion 22A.

Also, functionally, the extension panel 22 includes an inner peripheral portion 30 that is joined to the bent portions 16C, 16D, and 16E of the rear suspension tower 16 described above, and an outer peripheral portion 32 that is arranged to the outside of the inner peripheral portion 30 and to which the wheel housing outer 20 is joined. The inner peripheral portion 30 is an example of a first area portion and the outer peripheral portion 32 is an example of a second area portion. A width of the inner peripheral portion 30 is set to be the same as a flange width of the bent portions 16C, 16D, and 16E of the rear suspension tower 16. Meanwhile, a width of the outer peripheral portion 32 is set to approximately one-half of the width of the inner peripheral portion 30. Further, an outer edge of the outer peripheral portion 32 is bent in an L-shape toward the inner peripheral portion 30 side. This L-shaped portion will be referred to as "outer peripheral flange portion 34".

A step portion 36 is integrally provided, continuously along the entire periphery of a boundary portion between the inner peripheral portion 30 and the outer peripheral portion 32, between the inner peripheral portion 30 and the outer peripheral portion 32 of the extension panel 22 described above (i.e., between a first joint portion (first joint) 40 and a second joint portion (second joint) 42, which will be described later, of the extension panel 22). The step portion 36 is an example of an easily deformable portion. That is, the inner peripheral portion 30 and the outer peripheral portion 32 are connected via the step portion 36, and as a result, the inner peripheral portion 30 is arranged offset (i.e., protruding) to the vehicle width direction inside with respect to the outer peripheral portion 32 by the amount of the step. Also, the step portion 36 is formed as an inclined wall, not as a vertical wall, with respect to the outer peripheral portion 32. An inclination angle θ (see FIG. 7A) of the inclined wall of the step portion 36 with respect to the wheel housing outer 20 is set to an angle greater than 0° and equal to or less than 45°. However, the inclination angle θ may also be set to an inclination angle of greater than 45° and less than 90°, such as 60°, for example. By providing this step portion 36, a predetermined gap 38 is formed between the inner peripheral portion 30 of the extension panel 22 and the wheel housing outer 20.

The extension panel 22 described above is formed by a single part. That is, the inner peripheral portion 30, the outer peripheral portion 32, the step portion 36, and the outer peripheral flange portion 34 are all integrally formed at the time of press forming.

<Joint Structure of the Rear Suspension Tower 16 Using the Extension Panel 22 and the Wheel Housing Outer 20>

Next, a joint structure of the rear suspension tower 16 using the extension panel 22, and the wheel housing outer 20, will be described in detail with reference to FIGS. 2, 4, 5, and 7A.

As shown in FIGS. 2, 4, 5, and 7A, the rear suspension tower 16 made of die-cast aluminum described above is joined to the wheel housing outer 20 made of steel sheet, using the extension panel 22 that is made of steel sheet. Therefore, the fatigue strength of the wheel housing outer 20 and the extension panel 22 is stronger than the fatigue strength of the rear suspension tower 16.

More specifically, the rear suspension tower 16 includes the bent portions 16C, 16D, and 16E as described above. These bent portions 16C, 16D, and 16E are joined to the inner peripheral portion 30 of the extension panel 22 at the first joint portion 40. The first joint portion 40 is a mechanical joint structure. More specifically, a self-piercing rivet (SPR) 44 is used. On the other hand, the outer peripheral portion 32 of the extension panel 22 is joined to the wheel housing outer 20 at the second joint portion 42. The second joint portion 42 is a metallurgical joint structure. More specifically, a spot weld 46 is used.

Below, an even more detailed description of each part will be given. As shown in FIGS. 2, 5, and 7A, the front bent portion 16C of the rear suspension tower 16 is joined to the inner peripheral portion 30 positioned on the second extended portion 22B of the extension panel 22, by the self-piercing rivet 44, thus forming a two-ply structure (the first joint portion 40). Also, the outer peripheral portion 32 positioned on the second extended portion 22B of the extension panel 22 is joined to the wheel housing outer 20 and the front flange portion 26D of the roof side outer 26 by the spot weld 46, thus forming a three-ply structure (the second joint portion 42). Also, the step portion 36 is arranged between the first joint portion 40 formed by the self-piercing rivet 44 and the second joint portion 42 formed by the spot weld 46.

Also, as shown in FIGS. 2 and 5, the rear bent portion 16D of the rear suspension tower 16 is joined to the inner peripheral portion 30 positioned on the third extended portion 22C of the extension panel 22 by the self-piercing rivet 44, thus forming a two-ply structure (the first joint portion 40). Also, the outer peripheral portion 32 positioned on the third extended portion 22C of the extension panel 22 is joined to the wheel housing outer 20 by the spot weld 46 (the second joint portion 42). More specifically, the inside (i.e., the vehicle front-rear direction front side) of the outer peripheral portion 32 positioned on the third extended portion 22C is joined to the wheel housing outer 20 by the spot weld 46, thus forming a two-ply structure. Meanwhile, the outside (i.e., the vehicle front-rear direction rear side) of the outer peripheral portion 32 positioned on the third extended portion 22C is joined to the wheel housing outer 20 and a roof side outer rear 48 by the spot weld 46, thus forming a three-ply structure. Also, the step portion 36 is arranged between the first joint portion 40 formed by the self-piercing rivet 44 and the second joint portion 42 formed by the spot weld 46.

Furthermore, as shown in FIGS. 2 and 4, the bent portion 16E that is toward the center of the rear suspension tower 16 is joined to the inner peripheral portion 30 positioned on the first extended portion 22A of the extension panel 22 by the self-piercing rivet 44, thus forming a two-ply structure (the first joint portion 40). Also, the outer peripheral portion 32 positioned on the first extended portion 22A of the extension panel 22 is joined to the wheel housing outer 20 and the roof side inner 24 by the spot weld 46, thus forming a three-ply structure. Also, the step portion 36 is arranged between the first joint portion 40 formed by the self-piercing rivet 44 and the second joint portion 42 formed by the spot weld 46.

The number of panels joined by the spot weld 46 is not particularly limited, and may be changed from two to three or from three to two according to the vehicle model specifications.

As shown in FIG. 5, with this joint structure, when the rear suspension tower 16 is in a state joined to the wheel housing outer 20 via the extension panel 22, the rear suspension tower 16 that is formed having a generally U-shaped open sectional shape (a portion of which is omitted in FIG. 5) in which the vehicle width direction outside is open in a top sectional view, and the roof side outer 26 that is formed having a generally hat-shaped open sectional shape in which the vehicle width direction inside is open in a top sectional view, are formed in a shape joined together via the extension panel 22 and the wheel housing outer 20. In other words, the rear suspension tower 16 and the roof side outer 26 form a closed sectional structure (a chamber) via the wheel housing outer 20, by providing the extension panel 22.

Next, the operation and effects of the vehicle rear structure according to the example embodiment will be described. The rear suspension tower 16 is made of die-cast aluminum, and the wheel housing outer 20 and the extension panel 22 are made of metal material (steel sheet in this example embodiment) that has a higher fatigue strength than the rear suspension tower 16. Further, the extension panel 22 is interposed between the rear suspension tower 16 and the wheel housing outer 20. The rear suspension tower 16 is joined to the extension panel 22 at the first joint portion 40, and the wheel housing outer 20 is joined to the extension panel 22 at the second joint portion 42.

Here, in this example embodiment, the step portion 36, which is the example of the easily deformable portion, is provided between the first joint portion 40 and the second joint portion 42 of the extension panel 22. Therefore, when a pushing-up force A (see FIGS. 1 and 4) toward the vehicle upper side is input to the rear suspension tower 16 from a shock absorber of the rear suspension, not shown, while the vehicle is traveling, the step portion 36 elastically deforms, thus inhibiting deformation of the bent portions 16C, 16D, and 16E of the rear suspension tower 16.

More specifically, when traveling on a rough road, for example, the pushing-up force A (see FIGS. 1 and 4) toward the vehicle upper side is repeatedly input to the rear suspension tower 16 from the shock absorber, not shown. This pushing-up force A is input in a direction inclined at a predetermined angle toward the vehicle width direction inside with respect to the vertical direction. Consequently, a pulling force B (see FIGS. 1 and 4) toward the vehicle width direction inside is generated as a component force, and as a result, the rear suspension tower 16 is pulled toward the vehicle width direction inside.

Figure 8A:
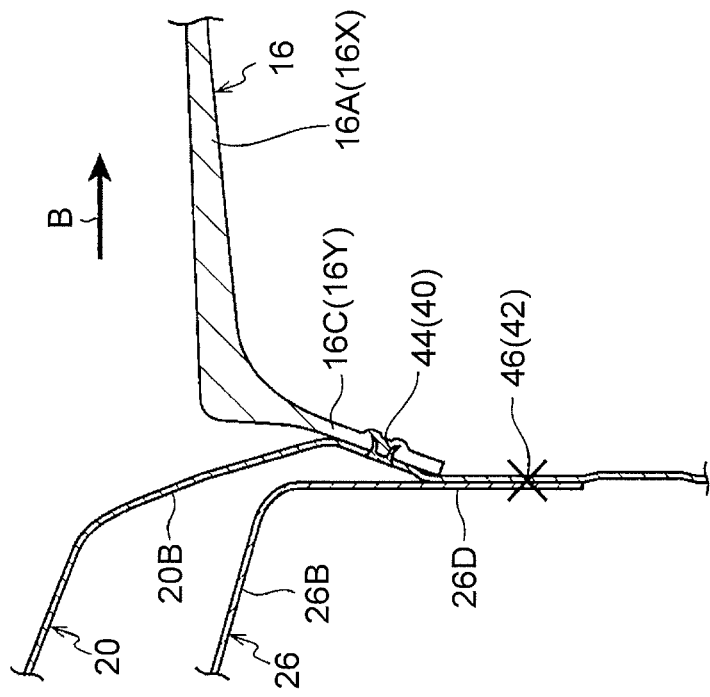
FIG. 8A is a top sectional view of a vehicle rear structure according to a comparative example.
Figure 8B:
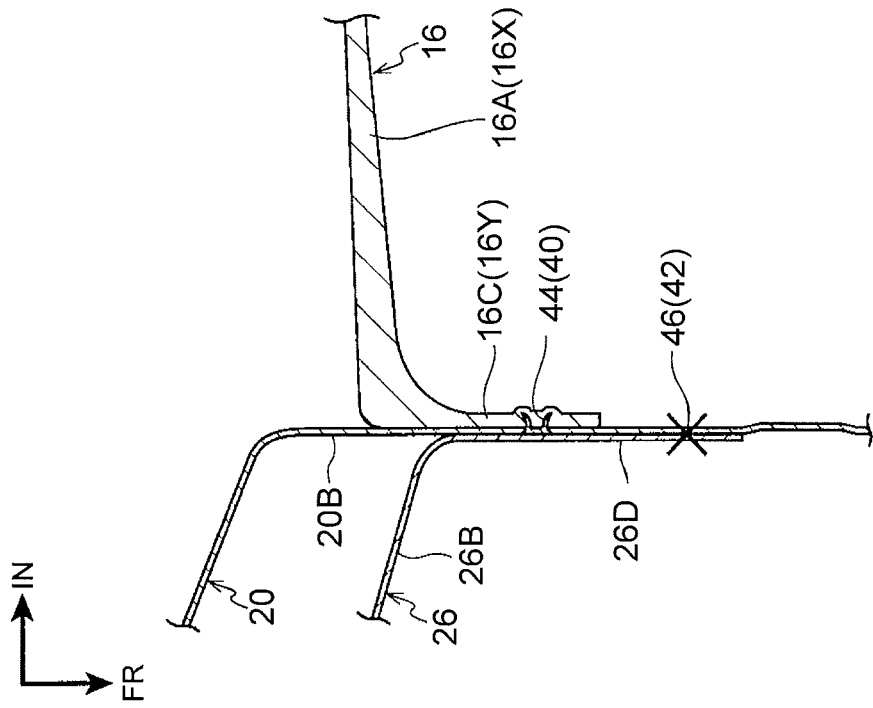
FIG. 8B is a top sectional view of a deformation mode when a pushing-up force toward the vehicle upper side acts on the rear suspension tower from the state shown in FIG. 8A.

FIG. 8A is an enlarged view of the main portions of the vehicle rear structure according to a comparative example. As shown in this drawing, in the comparative example, the extension panel 22 is not provided, and the bent portion 16C of the rear suspension tower 16 that is made of die-cast aluminum is joined directly to the wheel housing outer 20 at the first joint portion 40 by the self-piercing rivet 44. Although not shown, the bent portions 16D and 16E are also the same in this regard. This is also the same in the description of this example embodiment using FIGS. 7A and 7B that will be described later. Therefore, as shown in FIG. 8B, when the pulling force B described above acts on the rear suspension tower 16, the bent portion 16C largely deforms in a direction in which the angle with respect to the vertical wall portion 16A opens. Therefore, high stress is generated near the base, in particular, of the bent portion 16C. Here, the rear suspension tower 16 is made of die-cast aluminum and the wheel housing outer 20 is made of steel sheet, so the rear suspension tower 16 has lower fatigue strength than the wheel housing outer 20. It is therefore thought that if this kind of deformation repeatedly occurs in the bent portion 16C, metal fatigue will accumulate in the rear suspension tower 16 and the fatigue strength will be reached earlier than expected, and consequently, the durability of the rear suspension tower 16 will decrease (i.e., the life of the rear suspension tower 16 will be shortened).

However, with this example embodiment, the rear suspension tower 16 is joined to the wheel housing outer 20 via the extension panel 22 having the step portion 36, as shown in FIG. 7A, so when the pulling force B toward the vehicle width direction inside acts on the rear suspension tower 16, as shown in FIG. 7B, the step portion 36 of the extension panel 22 will elastically deform, so the rear suspension tower 16 itself will translate toward the vehicle width direction inside. As a result, deformation of the bent portion 16C will be suppressed. That is, a load (energy) that attempts to deform the bent portion 16C of the extension panel 22 is consumed (absorbed) as a load (energy) that elastically deforms the step portion 36, so the bent portion 16C of the extension panel 22 will not end up deforming by that amount (i.e., the amount that the bent portion 16C deforms is suppressed). As a result, according to this example embodiment, in a structure in which the rear suspension tower 16 that is made of die-cast aluminum is joined to the wheel housing outer 20 that is made of metal material (steel sheet) having higher fatigue strength than the rear suspension tower 16, the durability of the rear suspension tower 16 with respect to repeated input while the vehicle is traveling is able to be improved.

The effect in which deformation of the flange (i.e., the bent portions 16C, 16D, and 16E) of the rear suspension tower 16 is able to be suppressed is related to an effect in which the frame portion on the vehicle width direction outside of the vehicle rear portion formed by the roof side inner 24 and the roof side outer 26 is able to be inhibited from collapsing inward (i.e., deforming toward the vehicle width direction inside) when the pushing-up force A toward the vehicle upper side is input to the rear suspension tower 16.

Also, in this example embodiment, when a load (the pulling force B) in a direction away from the wheel housing outer 20 acts on the main body wall portion 16X (i.e., the vertical wall portion 16A and the upper surface portion 16B) of the rear suspension tower 16, the joining flange 16Y (i.e., the bent portions 16C, 16D, and 16E) is also pulled in the load acting direction (i.e., the direction in which the load acts on the rear suspension tower 16) by the load. Therefore, the extension panel 22 that is joined to the flange 16Y at the first joint portion 40 is pulled in the load acting direction. Because the extension panel 22 is joined to the wheel housing outer 20 at the second joint portion 42, when this load is applied, the step portion 36 of the extension panel 22 elastically deforms in the load acting direction (in the direction in which the load acts on rear suspension tower 16). As a result, input to the joining flange 16Y is reduced, so deformation of the joining flange 16Y is suppressed. That is, when the rear suspension tower 16 is a structure that includes the main body wall portion 16X and the joining flange 16Y that is bent from the main body wall portion 16X, and is joined to the wheel housing outer 20 at the joining flange 16Y, the joining flange 16Y tends to easily deform so as to open with respect to the main body wall portion 16X, but this opening deformation is able to be inhibited. As a result, when the rear suspension tower 16 is joined to the extension panel 22 at the joining flange 16Y, deformation of the flange 16Y of the rear suspension tower 16 is effectively suppressed, so the durability of the rear suspension tower 16 is able to be improved.

Moreover, in this example embodiment, the step portion 36 (the inclined wall), which is the example of the easily deformable portion, that is inclined with respect to the wheel housing outer 20 is formed between the first joint portion 40 and the second joint portion 42 of the extension panel 22, so performance related to absorbing deformation of the rear suspension tower 16 is able to be adjusted by adjusting the height (length) and inclination angle θ (see FIG. 7A) of the step portion 36. As a result, with this example embodiment, the performance related to absorbing deformation of the rear suspension tower 16 is able to be optimized.

Also, in this example embodiment, the inclination angle θ (see FIG. 7A) of the inclined wall of the step portion 36 with respect to the wheel housing outer 20 is set to an angle that is greater than 0° and equal to or less than 45°, so the inclination angle θ of the inclined wall of the step portion 36 may be said to be small. Therefore, the amount of elastic deformation of the extension panel 22 is able to be increased compared to when the inclination angle θ of the inclined wall of the step portion 36 is large. As a result, with this example embodiment, deformation of the joining flange 16Y (i.e., the bent portions 16C, 16D, and 16E) of the extension panel 22 is able to be effectively suppressed.

Furthermore, in this example embodiment, the extension panel 22 includes the inner peripheral portion 30 that is formed along the joining flange 16Y (i.e., the bent portions 16C, 16D, and 16E) and joined to the joining flange 16Y at the first joint portion 40, and the outer peripheral portion 32 that is arranged adjacent to the inner peripheral portion 30 and joined to the wheel housing outer 20 at the second joint portion 42, and the step portion 36, which is the example of the easily deformable portion, is provided at the boundary portion between the inner peripheral portion 30 and the outer peripheral portion 32. The joining flange 16Y of the rear suspension tower 16 is joined to the inner peripheral portion 30 of the extension panel 22 at the first joint portion 40. Also, the wheel housing outer 20 is joined to the outer peripheral portion 32 of the extension panel 22 at the second joint portion 42. Also, in this example embodiment, because the step portion 36 is provided at the boundary portion between the inner peripheral portion 30 and the outer peripheral portion 32 of the extension panel 22, the functions (such as strength and rigidity) of the "joining area" required by the inner peripheral portion 30 and the outer peripheral portion 32 are not lost by the step portion 36, that is the example of the easily deformable portion. As a result, with this example embodiment, a function of absorbing deformation of the rear suspension tower 16 is able to be given to the extension panel 22, while maintaining a good joining state between the extension panel 22 and the rear suspension tower 16 and the wheel housing outer 20.

Also, in this example embodiment, the flange 16Y (i.e., the bent portions 16C, 16D, and 16E) formed in an inverted U-shape is joined to the inner peripheral portion 30 of the extension panel 22, and the outer peripheral portion 32 formed on the outside of the inner peripheral portion 30 of the extension panel 22 is joined to the wheel housing outer 20. Also, the step portion 36, that is the example of the easily deformable portion, is formed along the entire periphery of the boundary portion between the inner peripheral portion 30 and the outer peripheral portion 32. Therefore, the step portion 36 of the extension panel 22 is able to be elastically deformed using all of the pulling force transmitted from the main body wall portion 16X (the vertical wall portion 16A and the upper surface portion 16B) of the rear suspension tower 16 to the flange 16Y. As a result, with this example embodiment, the step portion 36 of the extension panel 22 is able to be efficiently elastically deformed, so deformation of the rear suspension tower 16 is able to be effectively suppressed.

Moreover, in this example embodiment, the rear suspension tower 16 that is made of die-cast aluminum and the extension panel 22 that is made of metal material having higher fatigue strength than the rear suspension tower 16 are joined together by a mechanical joint structure. On the other hand, the extension panel 22 and the wheel housing outer 20 that is made of metal material having higher fatigue strength than the rear suspension tower 16 are joined together by a metallurgical joint structure. In this way, a joint structure that is more preferable for the type and combination of vehicle body panels is able to be employed when joining two vehicle body panels together. As a result, with this example embodiment, the joining of the rear suspension tower 16 and the extension panel 22 and the joining of the wheel housing outer 20 and the extension panel 22 are able to be optimized.

Also, in this example embodiment, the example of the first vehicle body panel is the rear suspension tower 16, the example of the second vehicle body panel is the wheel housing outer 20, and the example of the third vehicle body panel is the extension panel 22 that is formed separately from the rear suspension tower 16. Therefore, the extension panel 22 that is separate from the rear suspension tower 16 that is made of die-cast aluminum is interposed between the rear suspension tower 16 and the wheel housing outer 20. The rear suspension tower 16 and the extension panel 22 are joined at the first joint portion 40, and the wheel housing outer 20 and the rear suspension tower 16 are joined at the second joint portion 42. Accordingly, when a pushing-up force toward the vehicle upper side acts on the rear suspension tower 16 when the vehicle is traveling, a pulling force toward the vehicle width direction inside acts as a component force on the rear suspension tower 16. Therefore, the rear suspension tower 16 is pulled in a direction away from the wheel housing outer 20, but the step portion 36 that is the example of the easily deformable portion of the extension panel 22 elastically deforms, so the load applied to the rear suspension tower 16 is reduced. As a result, deformation of the rear suspension tower 16 is suppressed. Thus, in a structure in which the rear suspension tower 16 that is made of die-cast aluminum is joined to the wheel housing outer 20 that is made of metal material having higher fatigue strength than the rear suspension tower 16, the durability of the rear suspension tower 16 with respect to repeated input when the vehicle is traveling is able to be improved.

Second Example Embodiment

Next, a vehicle rear portion according to a second example embodiment will be described with reference to FIG. 9. Component parts in the second example embodiment that are the same as those in the first example embodiment described above will be denoted by like reference characters, and descriptions thereof will be omitted.

Figure 9:
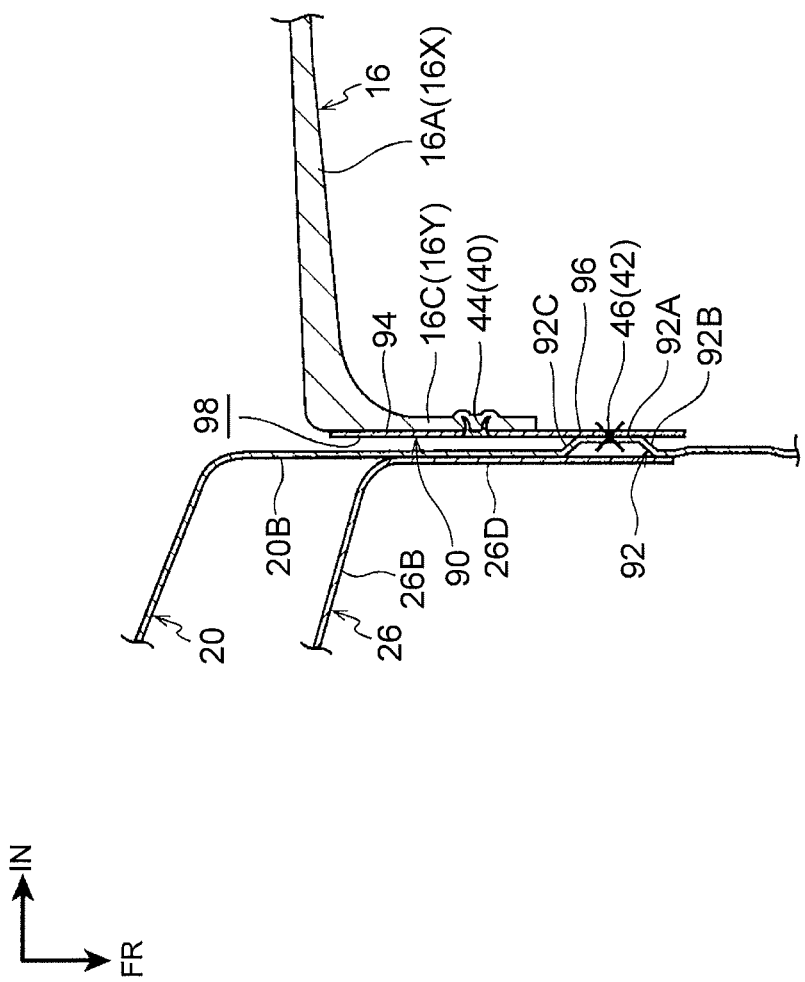
FIG. 9 is a top sectional view corresponding to FIG. 7, of a vehicle rear structure according to a second example embodiment.

As shown in FIG. 9, in this second example embodiment, a flat plate-shaped extension panel 90 without the step portion 36 described in the first example embodiment is used. Accordingly, an inner peripheral portion 94 and an outer peripheral portion 96 of the extension panel 90 are arranged on the same plane. Also, this extension panel 90 is also made of steel sheet. Further, the shape of the extension panel 90 in a side view is generally U-shaped similar to the extension panel 22 in the first example embodiment described above.

Meanwhile, a protruding portion 92 that protrudes toward the vehicle width direction inside is integrally formed on the wheel housing outer 20. The protruding portion 92 is an example of an easily deformable portion. The top sectional shape of the protruding portion 92 is hat-shaped, and includes a top wall portion 92A, and a pair of inclined wall portions, i.e., a front inclined wall portion 92B and a rear inclined wall portion 92C, formed one on each side of the top wall portion 92A in the vehicle front-rear direction. The protruding portion 92 is provided in three locations corresponding to the bent portions 16C, 16D, and 16E of the rear suspension tower 16.

The bent portion 16C of the rear suspension tower 16 is arranged abutting against the inner peripheral portion 94 of the extension panel 90, and is mechanically joined thereto by the self-piercing rivet 44 (the first joint portion 40), similar to the first example embodiment. Also, the top wall portion 92A of the protruding portion 92 formed on the wheel housing outer 20 is arranged abutting against the outer peripheral portion 96 of the extension panel 90, and metallurgically joined thereto by the spot weld 46 (the second joint portion 42). As a result, a gap 98 corresponding to the height of the protruding portion 92 is formed between the extension panel 90 and a general surface of the wheel housing outer 20. An open portion on the vehicle width direction outside of the protruding portion 92 is closed off by the front flange portion 26D of the roof side outer 26.

(Operation and Effects)

According to the structure described above, when a pushing-up force toward the vehicle upper side acts on the die-cast aluminum rear suspension tower 16 when the vehicle travels, a pulling force toward the vehicle width direction inside acts on the vertical wall portion 16A and the upper surface portion 16B of the rear suspension tower 16.

Here, as shown in FIG. 9, the joining flange 16Y (the front bent portion 16C in FIG. 9) of the rear suspension tower 16 is mechanically joined at the first joint portion 40 to the inner peripheral portion 94 of the extension panel 90 by the self-piercing rivet 44. On the other hand, the outer peripheral portion 96 of the extension panel 90 is metallurgically joined at the second joint portion 42 to the top wall portion 92A of the protruding portion 92 of the wheel housing outer 20 by the spot weld 46. Therefore, when a pulling force toward the vehicle width direction inside acts on the rear suspension tower 16, the extension panel 90 tries to rotate toward the vehicle width direction inside with the protruding portion 92 as the fulcrum. When the extension panel 90 rotates toward the vehicle width direction inside, the protruding portion 92 is consequently crushed toward the vehicle width direction outside by the outer peripheral portion 96 of the extension panel 90. Therefore, the protruding portion 92 that has the open sectional shape elastically deforms so as to open even more. As a result, deformation of the bent portion 16C of the die-cast aluminum rear suspension tower 16 is able to be suppressed by the amount that the protruding portion 92 elastically deforms. That is, even if the rear suspension tower 16 is made of aluminum alloy material having low fatigue strength, the protruding portion 92 set on the wheel housing outer 20 will elastically deform instead of the rear suspension tower 16, so the load on the rear suspension tower 16 is reduced, as a result, deformation of the rear suspension tower 16 is able to be suppressed.

As a result, with this example embodiment, in a structure in which the rear suspension tower 16 that is made of die-cast aluminum is joined to the wheel housing outer 20 that is made of metal material (steel sheet) having higher fatigue strength than the rear suspension tower 16, the durability of the rear suspension tower 16 with respect to repeated input when the vehicle is traveling is able to be improved.

Supplemental Description of the Example Embodiments

In the example embodiments described above, the disclosed vehicle body structure is applied to the rear portion 10A of the vehicle 10, but the disclosed vehicle body structure is not limited to this. That is, the disclosed vehicle body structure may also be applied to another portion of a vehicle. That is, in the example embodiments described above, the example of the first vehicle body panel is the rear suspension tower 16, and the example of the second vehicle body panel is the wheel housing outer 20, but they are not limited to this. That is, the example of the first vehicle body panel is not limited to the rear suspension tower 16 as long as the example of the first body panel is a vehicle body panel that is made of die-cast aluminum, and the example of the second vehicle body panel is not limited to the wheel housing outer 20 as long as the second body panel is a vehicle body panel that is made of metal material having higher fatigue strength than the example of the first vehicle body panel.

Also, in the example embodiments described above, the rear suspension tower 16 is given as an example of the first vehicle body panel, but the example of the first vehicle body panel is not limited to this. That is, the example of the first vehicle body panel may also be a reinforcement such as a reinforcing gusset that is joined to a rear suspension tower.

Further, in the example embodiments described above, panels made of steel sheet are used for the example of the second vehicle body panel and the example of the third vehicle body panel. However, the example of the second vehicle body panel and the example of the third vehicle body panel are not limited to this as long as they are made of metal material that has higher fatigue strength than the example of the first vehicle body panel that is made of die-cast aluminum.

Also, in the example embodiments described above, the bent portions 16C, 16D, and 16E of the rear suspension tower 16 and the extension panel 22 and 90 are joined by the self-piercing rivet 44, but they are not limited to this. That is, another mechanical joint structure may also be applied.

Moreover, in the first example embodiment described above, the step portion 36 is used as the example of the easily deformable portion, and in the second example embodiment, the protruding portion 92 is used as the example of the easily deformable portion, but the example of the easily deformable portion is not limited to these. Another structure may be used instead. For example, a structure in which the plate thickness is made thinner at a certain portion, or a slit-like hole or a partial opening is formed, may also be employed. Therefore, the example of the easily deformable portion refers to a portion where elastic deformation starts when a pulling force is applied toward the out-of-plane direction. Any structure capable of realizing this may be applied.

Also, in the example embodiments described above, the plate thickness of the rear suspension tower 16 is set thicker than the plate thickness of the wheel housing outer 20, but the plate thickness is not limited to this. The plate thicknesses of the rear suspension tower 16 and the wheel housing outer 20 may also be the same.

What is claimed is:

1. A vehicle body structure comprising:
   a first vehicle body panel that is made of die-cast aluminum;
   a second vehicle body panel that is made of a metal material having a higher fatigue strength than the die-cast aluminum of the first vehicle body panel; and
   a third vehicle body panel that is made of a metal material having a higher fatigue strength than the die-cast aluminum of the first vehicle body panel, the third vehicle body panel being joined to the first vehicle body panel by a first joint, the third vehicle body panel being interposed between the first vehicle body panel and the second vehicle body panel and the third vehicle body panel being joined to the second vehicle body panel by a second joint, wherein the third vehicle body panel includes a deformable portion provided between the first joint and the second joint, the deformable portion configured to elastically deform, when a load in a direction away from the second vehicle body panel acts on the first vehicle body panel, in the direction in which the load acts on the first vehicle body panel.

2. The vehicle body structure according to claim 1, wherein
the first vehicle body panel includes a main body wall portion and a joining flange that is bent from an end portion of the main body wall portion; and
the flange is joined to the third vehicle body panel by the first joint.

3. The vehicle body structure according to claim 1, wherein
the deformable portion of the third vehicle body panel is a step portion having an inclined wall that is inclined with respect to the second vehicle body panel.

4. The vehicle body structure according to claim 3, wherein
an inclination angle of the inclined wall of the step portion with respect to the second vehicle body panel is set to an angle of greater than 0° and equal to or less than 45°.

5. The vehicle body structure according to claim 2, wherein
the third vehicle body panel includes a first portion having an area and a second portion having an area, the first portion being positioned adjacent to the flange and being joined to the flange by the first joint, and the second portion being positioned adjacent to the second vehicle body panel and being joined to the second vehicle body panel by the second joint; and
the deformable portion is formed in a boundary area that extends between the first portion and the second portion.

6. The vehicle body structure according to claim 5, wherein
the main body wall portion has an inverted U-shape in which a vehicle lower side is open in a side view viewed from a vehicle width direction outside;
the flange is formed in an inverted U-shape on an end portion outer periphery on the vehicle width direction outside of the main body wall portion in the side view viewed from the vehicle width direction outside;
the first portion of the third vehicle body panel is formed in an inverted U-shape following the flange, and the second portion of the third vehicle body panel is formed in an inverted U-shape to an outside of the first portion; and
the deformable portion is formed along an entire periphery of the boundary area between the first portion and the second portion.

7. The vehicle body structure according to claim 1, wherein
the first joint is a mechanical joint; and
the second joint is a metallurgical joint.

8. The vehicle body structure according to claim 7, wherein
the first joint is a rivet; and
the second joint is a weld.

9. The vehicle body structure according to claim 1, wherein
the first vehicle body panel is a rear suspension tower;
the second vehicle body panel is a wheel housing outer; and
the third vehicle body panel is an extension panel that is formed separately from the rear suspension tower and separately from the wheel housing outer.

10. A vehicle body structure comprising:
a first vehicle body panel that is made of die-cast aluminum;
a second vehicle body panel that is made of a metal material having a higher fatigue strength than the die-cast aluminum of the first vehicle body panel; and
a third vehicle body panel that is made of a metal material having a higher fatigue strength than the die-cast aluminum of the first vehicle body panel, the third vehicle body panel being joined to the first vehicle body panel by a first joint, the third vehicle body panel being interposed between the first vehicle body panel and the second vehicle body panel and the third vehicle body panel being joined to the second vehicle body panel at a second joint, wherein
the second vehicle body panel includes a deformable portion provided on a portion of the second vehicle body panel where the second joint is located, the deformable portion configured to elastically deform, when a load in a direction away from the second vehicle body panel acts on the first vehicle body panel, in the direction in which the load acts on the first vehicle body panel.

11. The vehicle body structure according to claim 10, wherein
the first vehicle body panel is a rear suspension tower;
the second vehicle body panel is a wheel housing outer; and
the third vehicle body panel is an extension panel that is formed separately from the rear suspension tower and separately from the wheel housing outer.

12. The vehicle body structure according to claim 10, wherein
the first vehicle body panel includes a main body wall portion and a joining flange that is bent from an end portion of the main body wall portion; and
the flange is joined to the third vehicle body panel by the first joint.

13. The vehicle body structure according to claim 10, wherein
the deformable portion of the second vehicle body panel is a protruding portion having an inclined wall that is inclined with respect to the third vehicle body panel.

14. The vehicle body structure according to claim 13, wherein
an inclination angle of the inclined wall of the protruding portion with respect to the third vehicle body panel is set to an angle of greater than 0° and equal to or less than 45°.

15. The vehicle body structure according to claim 10, wherein
the first joint is a mechanical joint; and
the second joint is a metallurgical joint.

16. The vehicle body structure according to claim 15, wherein
the first joint is a rivet; and
the second joint is a weld.

* * * * *